(12) United States Patent
Flores (10) Patent No.: US 12,498,738 B2
(45) Date of Patent: Dec. 16, 2025

(54) DRONE-MOUNTED COMPRESSION DEAD-ENDS INSPECTION X-RAY PAYLOAD DEVICE

(71) Applicant: Frank Flores, Temecula, CA (US)

(72) Inventor: Frank Flores, Temecula, CA (US)

( * ) Notice: Subject to any disclaimer, the term of this patent is extended or adjusted under 35 U.S.C. 154(b) by 170 days.

(21) Appl. No.: 18/591,626

(22) Filed: Feb. 29, 2024

(65) Prior Publication Data

US 2025/0053180 A1   Feb. 13, 2025

Related U.S. Application Data

(60) Provisional application No. 63/518,111, filed on Aug. 8, 2023.

(51) Int. Cl.
| | | |
|---|---|---|
| *G05D 1/656* | (2024.01) | |
| *B64U 20/70* | (2023.01) | |
| *B64U 101/26* | (2023.01) | |
| *G05D 105/80* | (2024.01) | |
| *G05D 109/20* | (2024.01) | |

(52) U.S. Cl.
CPC ............ *G05D 1/656* (2024.01); *B64U 20/70* (2023.01); *B64U 2101/26* (2023.01); *G05D 2105/89* (2024.01); *G05D 2109/20* (2024.01)

(58) Field of Classification Search
None
See application file for complete search history.

(56) References Cited

U.S. PATENT DOCUMENTS

2014/0126695 A1* 5/2014 Stock .................... G01N 23/04
378/58

FOREIGN PATENT DOCUMENTS

WO   WO-2019187166 A1 * 10/2019 ........... G05D 1/0094

OTHER PUBLICATIONS

C. Jianye, G. Yu, J. Liang, W. Qin, K. Zhu and T. Liu, "Research on X-ray Live Inspection Method for Tensile Clamps of Transmission Lines," 2022 7th Asia Conference on Power and Electrical Engineering (ACPEE), Hangzhou, China, 2022, pp. 1441-1445, doi: 10.1109/ACPEE53904.2022.9784061. (Year: 2022).*

* cited by examiner

*Primary Examiner* — Peter D Nolan
*Assistant Examiner* — Michael F Whalen
(74) *Attorney, Agent, or Firm* — Brennan, Manna & Diamond, LLC (57) ABSTRACT

A drone-mounted X-ray payload device designed for the safe and autonomous inspection of compression dead-ends on power lines is disclosed. The device comprises a lightweight, durable frame with parallel-aligned frame members fastened together by a support cage. The cage includes a ring for mounting the device to a drone. A cantilever X-ray panel housing is attached to the frame and houses an X-ray plate and includes movable pivoting supporting members to prevent lateral movement of the plate. The device also incorporates an X-ray generator and antenna support frame, facilitating the positioning and movement of the X-ray generator. Additional features include a radio antenna for drone operation and a system of rubber wheel drivers, an electric motor for autonomous movement, and precise positioning of the X-ray plate relative to the power lines. The device enables remote operation and improved access to difficult-to-reach areas of power lines.

20 Claims, 5 Drawing Sheets

DRONE-MOUNTED COMPRESSION DEAD-ENDS INSPECTION X-RAY PAYLOAD DEVICE

CROSS-REFERENCE TO RELATED APPLICATION

The present application claims priority to, and the benefit of, U.S. Provisional Application No. 63/518,111, which was filed on Aug. 8, 2023, and is incorporated herein by reference in its entirety.

FIELD OF THE INVENTION

The present invention generally relates to the field of inspecting compression dead-ends of power lines. More specifically, the present invention relates to a novel X-ray payload device that can be mounted to a drone for inspecting the compression dead-ends. The device obviates the requirement of workers to go to the compression dead-ends. The device includes a frame, a cantilever X-ray panel housing, a generator and antenna support frame, a support cage, and an electric motor and rubber drive wheels. Accordingly, the present disclosure makes specific reference thereto. Nonetheless, it is to be appreciated that aspects of the present invention are also equally applicable to other like applications, devices, and methods of manufacture.

BACKGROUND

By way of background, compression dead-ends (CDEs) are critical components of power transmission and distribution lines and are responsible for maintaining tension and preventing line sag. However, the location of the compression dead-ends are high above the ground and within energized lines which makes it difficult to access them for routine inspection. Traditionally, X-ray systems have been used to assess the internal condition of CDEs for signs of wear, corrosion, or cracks.

Generally, for checking CDEs, specialized equipment and manpower are required. Technicians use bulky X-ray machines and bucket trucks that are difficult to move or position. This conventional process also exposes workers to several hazards. Working at heights near live electrical wires increases the risk of electrical shocks or falls. Using heavy equipment requires physical effort and hard work, leading to potential strains and injuries. Moving large crews and specialized equipment often disrupts power delivery and causes significant operational costs. The conventional devices to approach compression dead-ends inspection offer limited accessibility, high costs, and limited scope.

Therefore, there exists a long-felt need in the art for a safer method of X-raying compression dead-ends. There is also a long-felt need in the art for an X-raying device that enables users to inspect compression dead-ends without requiring them to go near the dead-ends. Additionally, there is a long-felt need in the art for an X-ray payload device that can be attached to a drone for enabling a user to remotely inspect compression dead-ends. Moreover, there is a long-felt need in the art for an X-ray payload device that significantly reduces safety risks associated with the use of heavy equipment for inspecting compression dead-ends. Further, there is a long-felt need in the art of a payload device for X-raying compression dead-ends that provides improved accessibility and obviates requirement of workers to physically go near the compression dead-ends. Finally, there is a long-felt need in the art for an improved X-raying compression dead-end device that is faster, more efficient and requires fewer personnel, leading to significant cost savings for the inspections.

The subject matter disclosed and claimed herein, in one embodiment thereof, comprises a drone-mounted X-ray payload device for inspecting compression dead-ends. The X-ray payload device features a frame which includes a first frame member and a second frame member, the frame members are aligned parallel to each other and fastened together with a support cage. The frame is used for accommodating and stabilizing a compression dead-end conductor which passes through the frame members for X-raying the compression dead-ends. A cantilever X-ray panel housing is attached to the frame and adapted to house an X-ray plate wherein housing can extend from the frame for positioning of the X-ray plate. The cantilever X-ray panel also includes one or more movable pivoting supporting members to prevent movement of the X-ray plate. An X-ray generator and antenna support frame extends from the bottom ends of the frame member legs and is designed to hold an X-ray generator and a radio antenna.

In this manner, the drone-mounted X-ray payload device of the present invention accomplishes all of the foregoing objectives and provides users with a system for safely and efficiently conducting X-ray inspections of power line components. The device combines remote operation capabilities with specialized hardware to improve the safety and effectiveness of power line maintenance tasks. The device significantly reduces safety risks and being attached to a drone enables navigation to reach dead-ends inaccessible by conventional methods. The device is faster, more efficient, and requires fewer personnel, leading to significant cost savings for the inspections.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a drone-mounted X-ray payload device for inspecting compression dead-ends. The X-ray payload device further comprises a frame which includes a first frame member and a second frame member, the frame members are aligned parallel to each other and fastened together with a support cage. A cantilever X-ray panel housing is attached to the frame and adapted to house an X-ray plate. The cantilever X-ray panel also includes one or more movable pivoting supporting members to prevent movement of the X-ray plate. An X-ray generator and antenna support frame extending from the bottom ends of the frame member legs and designed to hold an X-ray generator and a radio antenna. A compression dead-end conductor passes through the frame members for X-raying the compression dead-ends.

In another aspect, a drone-mounted X-ray payload device for power line inspection. The payload device includes a frame with a pair of symmetrical frame members, each frame member has a gap to enable a compression dead-end conductor to pass therethrough for X-raying, a cantilever X-ray panel housing for flexible positioning of an X-ray plate relative to power lines, and an electric motor component and a pair of rubber wheel drivers for autonomous movement and adjustment of the position of the compression dead-end conductor during inspection. A radio antenna is fastened to the frame for transmitting radio waves to operate the drone.

In yet another embodiment, the frame members are made of fiberglass and the X-ray panel housing is made using 3D printed plastic.

In a further embodiment, a method for inspecting compression dead-ends on power lines using a drone-mounted X-ray payload device is described. The method comprising the steps of providing the X-ray payload device, the device includes a frame, a cantilever X-ray panel housing, a generator and antenna support frame, a support cage, and an electric motor and rubber drive wheels. The method further includes attaching the X-ray payload device to a drone, navigating the drone to a compression dead-end location, and positioning the X-ray payload device using the drone to align the X-ray plate with the compression dead-end for inspection.

In yet another aspect of the present invention, the electric motor rotates and moves the rubber drive wheels for positioning the compression dead-end conductor.

In another embodiment of the present invention, a drone-mounted X-ray payload device for X-raying compression dead-ends is disclosed. The device comprises a frame having a pair of interconnected symmetrical inverted U-shape frame members, a cage connecting the frame members and including a ring for mounting the payload device to the drone, an X-ray plate accommodated in a housing, the housing is connected to one of the frame members, the X-ray plate is adapted to move relative to the frame, an X-ray generator for generating X-rays and a radio antenna for operating with a remote drone operator, a compression dead-end conductor passes through the frame members for X-raying the compression dead-ends without requiring a user to go near the compression dead-ends.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a safer method of X-raying compression dead-ends. There is also a long-felt need in the art for an X-raying device that enables users to inspect compression dead-ends without requiring them to go near the dead-ends. Additionally, there is a long-felt need in the art for an X-ray payload device that can be attached to a drone for enabling a user to remotely inspect compression dead-ends. Moreover, there is a long-felt need in the art for an X-ray payload device that significantly reduces safety risks associated with use of heavy equipment for inspecting compression dead-ends. Further, there is a long-felt need in the art of a payload device for X-raying compression dead-ends that provides improved accessibility and obviates requirement of workers to physically go near the compression dead-ends. Finally, there is a long-felt need in the art for an improved X-raying compression dead-end device that is faster, more efficient and requires fewer personnel, leading to significant cost savings for the inspections.

The present invention, in one exemplary embodiment, is a drone-mounted X-ray payload device for X-raying compression dead-ends. The device comprises a frame having a pair of interconnected symmetrical inverted U-shape frame members, a cage connecting the frame members and including a ring for mounting the payload device to the drone, an X-ray plate accommodated in a housing, the housing is connected to one of the frame members, the X-ray plate is adapted to move relative to the frame, an X-ray generator for generating X-rays and a radio antenna for operating with a remote drone operator, a compression dead-end conductor passes through the frame members for X-raying the compression dead-ends without requiring a user to go near the compression dead-ends.

Referring initially to FIGS. 1-5, the basic constructional details and principles of operation of embodiments of an X-ray payload device 100 are provided.

Figure 1:
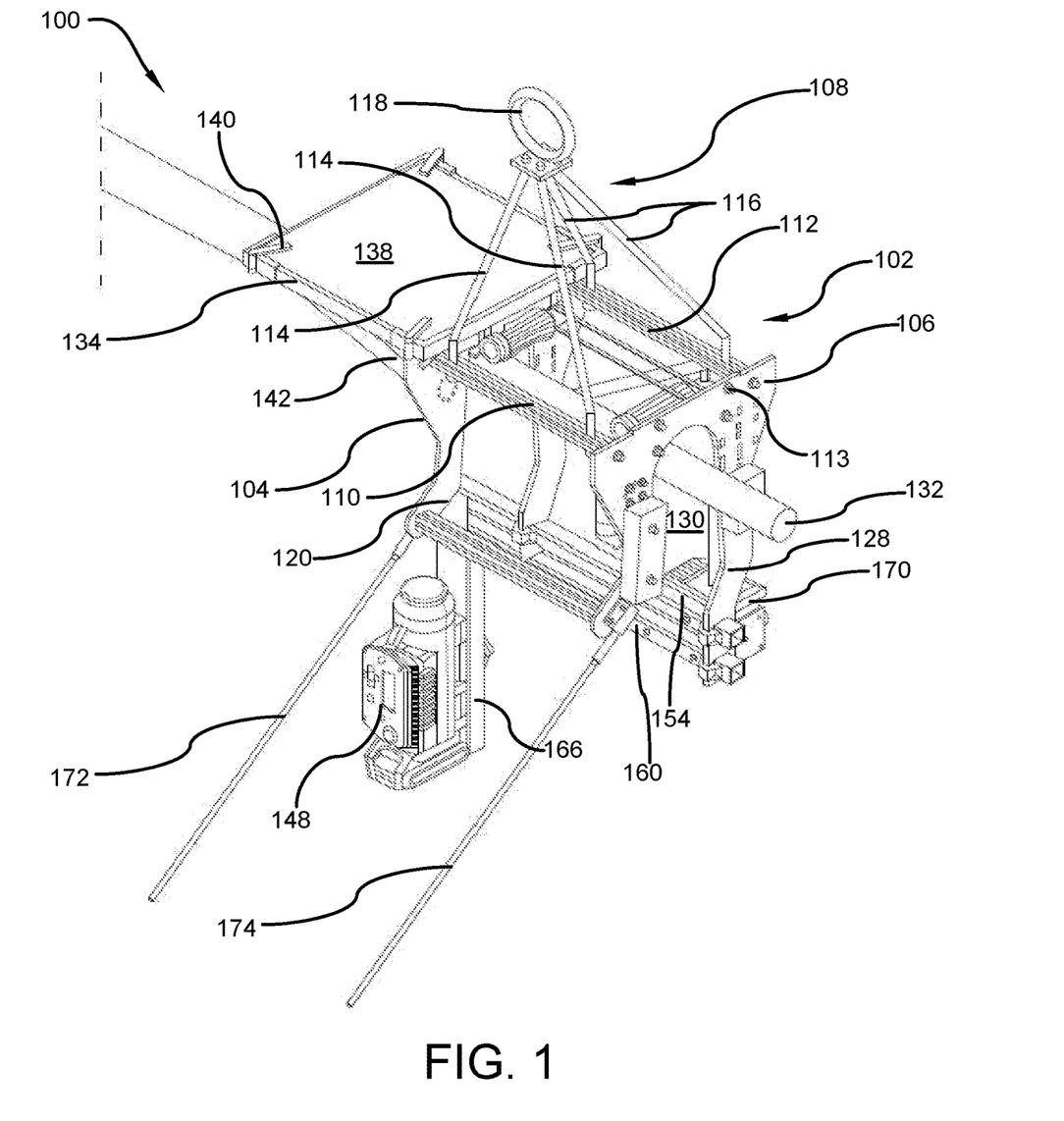
FIG. 1 illustrates a perspective view of the compression dead-ends inspection X-ray payload device of the present invention in accordance with the disclosed architecture.

FIG. 1 illustrates a perspective view of the compression dead-ends inspection X-ray payload device of the present invention in accordance with the disclosed architecture. The drone-mounted compression dead-ends X-ray payload device 100 of the present invention is designed to be mounted to a UAS (Unmanned Aerial System) drone for enabling autonomous and safe inspection of compression dead-ends. The X-ray payload device 100 enables use of drones for X-raying compression dead-ends and accordingly, introduces benefits, such as remote operation, improved safety for operators, and potentially better access to difficult-to-reach areas of power lines.

More specifically, the UAS mounted X-ray payload device 100 includes a frame 102 that includes a first frame member 104 and a second frame member 106. The frame member 104, 106 are preferably made of fiberglass but can be made of any other lightweight and durable material. The frame members 104, 106 are symmetrical and aligned parallel to each other. Further, the frame members 104, 106 are fastened together using a support cage 108. The support cage 108 includes longitudinal aluminum members 110, 112 extending between the frame members 104, 106 and fastened through a plurality of screws 113 and a plurality of arms 114, 116 diverge from a circular hook 118 to the aluminum members 110, 112 respectively. The arms 114 extend to the first longitudinal aluminum member 110 and the arms 116 extend to the second longitudinal aluminum member 112.

Figure 2:
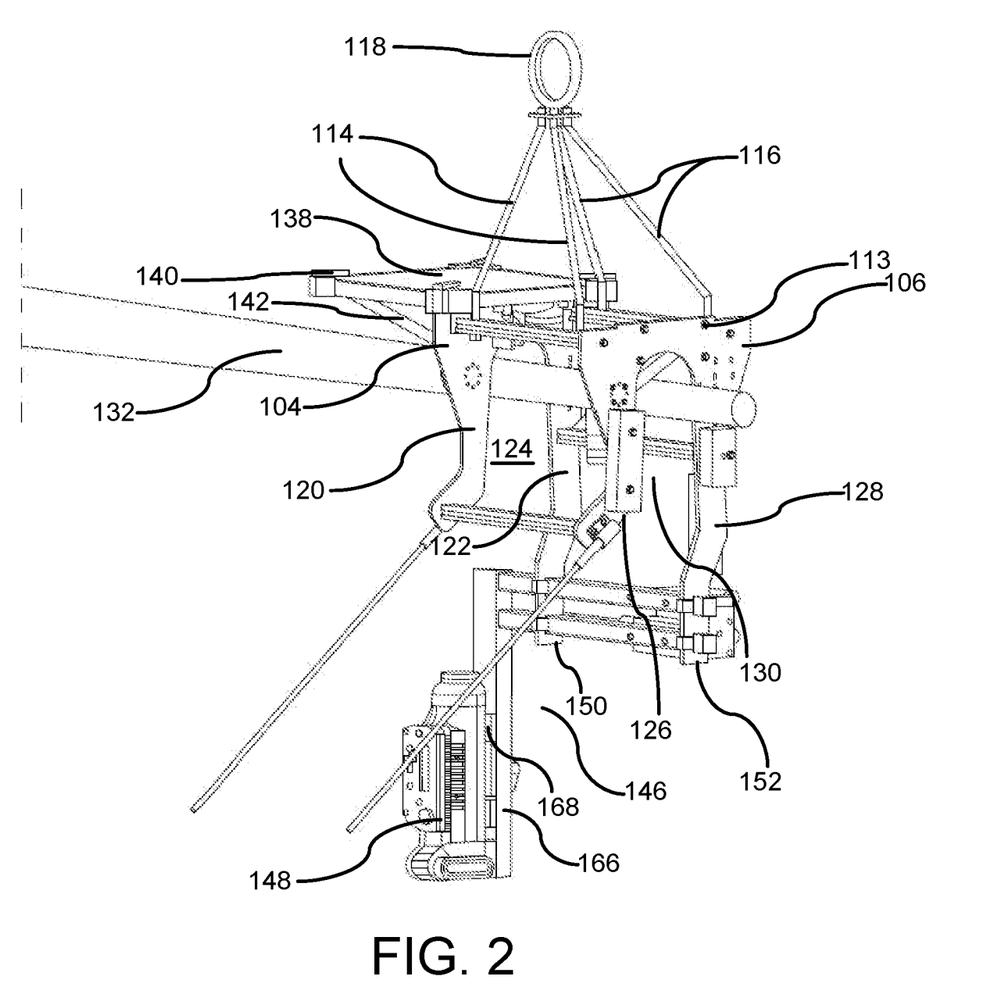
FIG. 2 illustrates another perspective view of the compression dead-ends inspection X-ray payload device of the present invention in accordance with the disclosed architecture.

Referring now to FIGS. 1 and 2, the first frame member 104 includes a first leg 120 and a second leg 122 forming an inverted U-shaped of the first frame member 104. The first leg 120 is slightly shorter than the second leg 122 and provides a gap 124 therebetween. Similarly, the second frame member 106 includes a first leg 126 and a second leg 128 forming an inverted U-shape of the second frame member 106. A gap 130 corresponding to the gap 124 is formed between the legs 126, 128. The gaps 124, 130 are symmetrical and are adapted to enable a compression dead-end conductor 132 to pass therethrough for X-raying compression dead-ends.

A cantilever X-ray panel housing 134 is attached to the top end 136 of the first frame member 104. The housing 134 is adapted for housing an X-ray plate 138, preferably having a size of 10"×10". The housing 134 includes a plurality of moveable pivoting supporting members 140 for preventing lateral movement and sliding of the X-ray plate 138. The housing 134 is preferably made using 3D printed plastic but can be made using any other similar technology or process. A rear supporting member 142 provides support to the bottom surface 144 of the X-ray plate 138. The housing 134 is sized as per the X-ray plate 138 and can be square or rectangular. The cantilever X-ray panel housing 134 enables for more flexible positioning of the X-ray plate 138 relative to the power lines and helps in effective X-raying of compression dead-ends.

Figure 3:
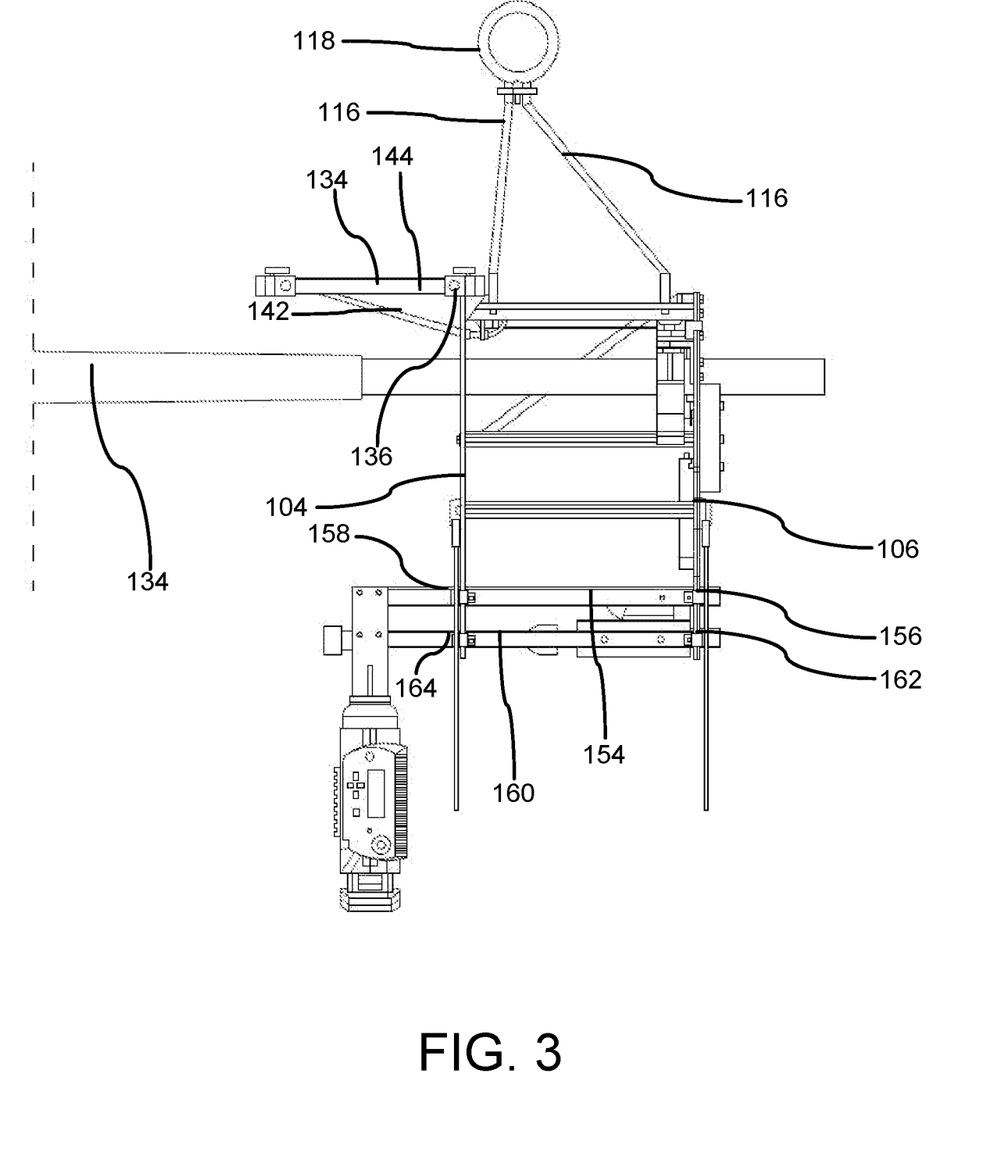
FIG. 3 illustrates a side view of the compression dead-ends inspection X-ray payload device of the present invention in accordance with the disclosed architecture.

Referring now to FIGS. 1, 2, and 3, the X-ray payload device 100 includes an X-ray generator and antenna support frame 146 for accommodating and holding an X-ray generator 148. The frame 146 is preferably L-shaped and extends through the bottom ends 150, 152 of the frame member legs 122, 128 respectively. The X-ray generator and antenna support frame 146 includes a first horizontal member 154 that passes through the apertures 156, 158 and a second horizontal member 160 passes through the apertures 162, 164. The horizontal members 154, 160 are connected to a transverse member 166 that includes a channel 168 for holding and sliding the X-ray generator 148.

A radio antenna 170 is fastened to the leg 128 of the frame member 106 and is used for transmitting radio waves to aid in the process of operating the drone to which the payload device 100 is attached. A pair of stabilizing clutch wires 172, 174 are fastened to the legs 120, 126 respectively.

Figure 4:
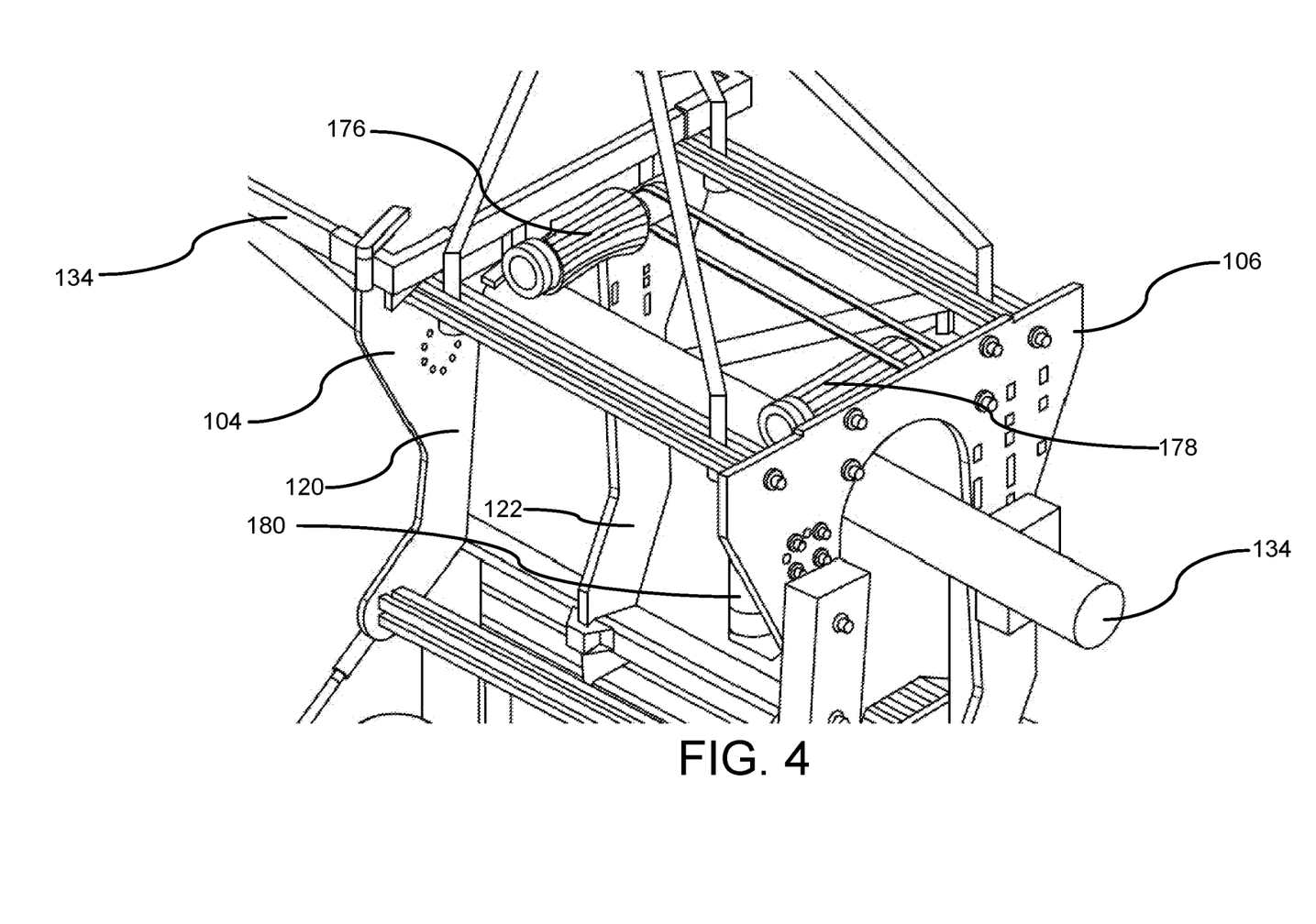
FIG. 4 illustrates an enlarged view of the compression dead-ends inspection X-ray payload device showing rubber wheel drivers and electric motor.
Figure 5:
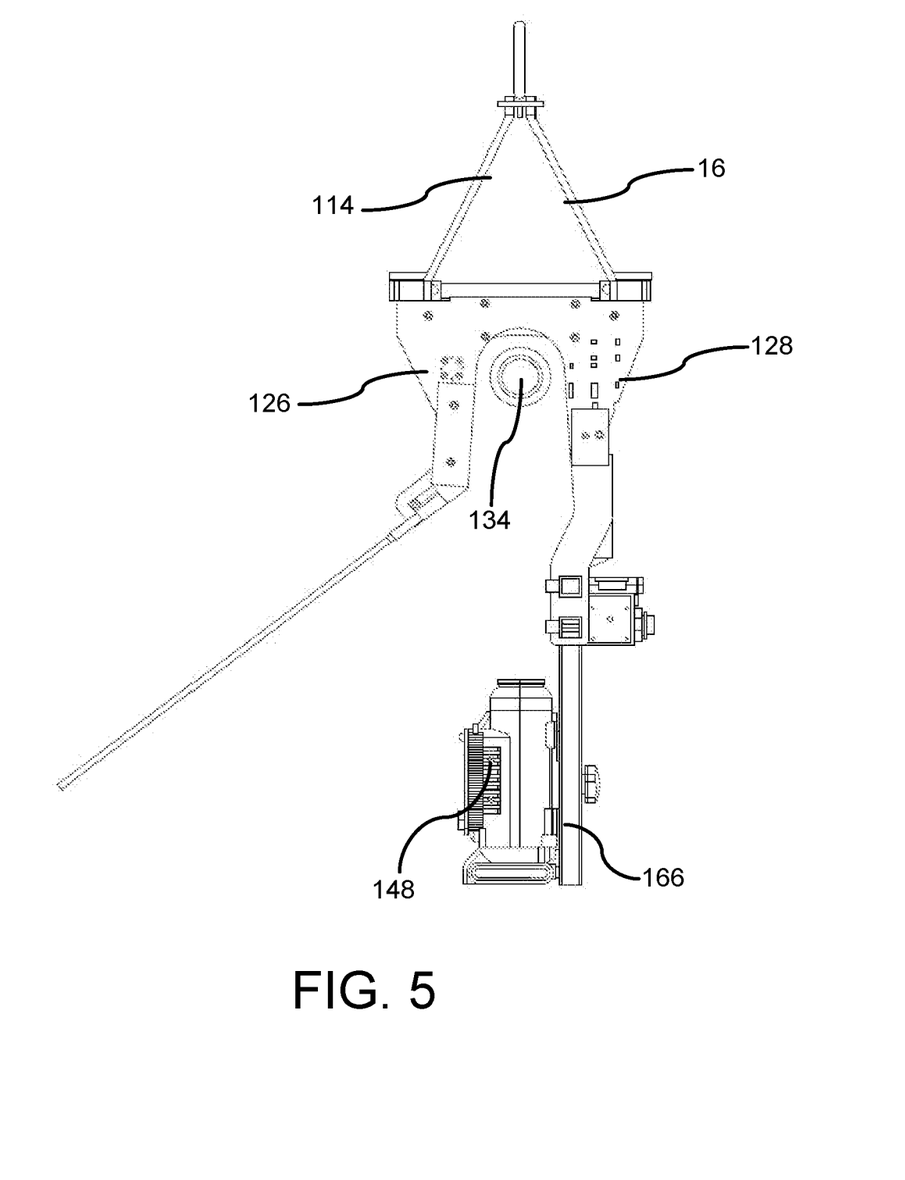
FIG. 5 illustrates a rear view of the compression dead-ends inspection X-ray payload device.

Referring now to FIG. 4, the X-ray payload device 100 includes a pair of rubber wheel drivers 176, 178. The first wheel driver 176 is fastened to the first frame member 104 and the second wheel driver 178 is fastened to the second frame member 106. An electric motor component 180 is also included in the X-ray payload device 100 for lateral or rotational movement along the compression dead-end conductor 132. The motor 180 also rotates the rubber wheel drivers 176, 178 for an effective movement along the compression dead-end conductor 132. The rubber wheel drivers 176, 178 and the motor 180 provide autonomous movement of the housing 134 enabling the housing 134 to position correctly on the power line or to adjust the angle of the X-ray panel 138.

The X-ray payload device 100 can be removably attached to a drone using circular hook 118. The device 100 can be used without a manual operator to carry the device 100 to a compression dead-end. The cantilever housing 134 can extend out of the frame 102 for enabling different positions of the X-ray plate 138.

In some embodiments, a method for inspecting compression dead-ends on power lines using a drone-mounted X-ray payload device is included. The method comprising the steps of providing the X-ray payload device, the device includes a frame, a cantilever X-ray panel housing, a generator and antenna support frame, a support cage, and an electric motor and rubber drive wheels. The method further includes attaching the X-ray payload device to a drone, navigating the drone to a compression dead-end location, and positioning the X-ray payload device using the drone to align the X-ray plate with the compression dead-end for inspection.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "compression dead-ends inspection X-ray payload device", "drone-mounted compression dead-ends X-ray payload device", "X-ray payload device", "UAS mounted X-ray payload device", and "device" are interchangeable and refer to the drone-mounted compression dead-ends X-ray inspection payload device 100 of the present invention.

Notwithstanding the foregoing, the drone-mounted compression dead-ends X-ray inspection payload device 100 of the present invention can be of any suitable size and configuration as is known in the art without affecting the overall concept of the invention, provided that it accomplishes the above-stated objectives. One of ordinary skill in the art will appreciate that the drone-mounted compression dead-ends X-ray inspection payload device 100 as shown in the FIGS. are for illustrative purposes only, and that many other sizes and shapes of the drone-mounted compression dead-ends X-ray inspection payload device 100 are well within the scope of the present disclosure. Although the dimensions of the drone-mounted compression dead-ends X-ray inspection payload device 100 are important design parameters for user convenience, the drone-mounted compression dead-ends X-ray inspection payload device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A drone-mounted X-ray payload device comprising:
an Unmanned Aerial System (UAS) drone having an X-ray payload device including a frame with a first frame member and a second frame member fastened together with a support cage, and a cantilever X-ray panel housing;
wherein said support cage having a pair of longitudinal members extending between said first frame member and said second frame member;
wherein said support cage further having a plurality of arms diverging from a hook;
wherein said plurality of arms connecting said pair of longitudinal members of said support cage to said hook;
wherein said first frame member having a first leg and a second leg forming an inverted U-shape of said first frame member, further wherein said first frame member said first leg and said second leg forming a first gap therebetween;
wherein said second frame member having a first leg and a second leg forming an inverted U-shape of said second frame member, further wherein said second frame member said first leg and said second leg forming a second gap therebetween; and
further wherein said first gap and said second gap include a spacing to enable a compression dead-end conductor to pass therethrough for X-raying of the compression dead-end.

2. The drone-mounted X-ray payload device of claim 1, wherein said cantilever X-ray panel housing attached to a top end of said first frame member.

3. The drone-mounted X-ray payload device of claim 2, wherein said cantilever X-ray panel housing having an X-ray plate.

4. The drone-mounted X-ray payload device of claim 3, wherein said cantilever X-ray panel housing having a plurality of moveable pivoting supporting members for preventing lateral movement of said X-ray plate.

5. The drone-mounted X-ray payload device of claim 4, wherein said X-ray plate having a rear supporting member to support a bottom surface of said X-ray panel housing.

6. The drone-mounted X-ray payload device of claim 5, wherein said X-ray payload device having an X-ray generator and a support frame for holding said X-ray generator.

7. The drone-mounted X-ray payload device of claim 6, wherein said frame is L-shaped having a first horizontal member, a second horizontal member, and a transverse member connecting said first horizontal member and said second horizontal member, and further wherein said transverse member having a channel for holding and sliding said X-ray generator.

8. A drone-mounted X-ray payload device comprising:
an X-ray payload device having a first frame member, a second frame member, and a cantilever X-ray panel housing;
wherein said first frame member fastened together with a support cage;
wherein said support cage having a pair of longitudinal members extending between said first frame member and said second frame member;
wherein said support cage further having a plurality of arms diverging from a hook;
wherein said plurality of arms connecting said pair of longitudinal members of said support cage to said hook;
wherein said first frame member having a first leg and a second leg forming an inverted U-shape of said first frame member, further wherein said first frame member said first leg is shorter than said second leg forming a first gap therebetween;
wherein said second frame member having a first leg and a second leg forming an inverted U-shape of said second frame member, further wherein said second frame member said first leg is shorter than said second leg forming a second gap therebetween;
wherein said first gap and said second gap include a spacing to enable a compression dead-end conductor to pass therethrough for X-raying of the compression dead-end; and
further wherein said X-ray payload device having an X-ray generator and a support frame for holding said X-ray generator.

9. The drone-mounted X-ray payload device of claim 8, wherein said cantilever X-ray panel housing attached to a top end of said first frame member.

10. The drone-mounted X-ray payload device of claim 8, wherein said cantilever X-ray panel housing having an X-ray plate.

11. The drone-mounted X-ray payload device of claim 10, wherein said cantilever X-ray panel housing having a plurality of moveable pivoting supporting members for preventing lateral movement of said X-ray plate.

12. The drone-mounted X-ray payload device of claim 10, wherein said X-ray plate having a rear supporting member to support a bottom surface of said X-ray panel housing.

13. The drone-mounted X-ray payload device of claim 8, wherein said frame is L-shaped having a first horizontal member, a second horizontal member, and a transverse member connecting said first horizontal member and said second horizontal member, and further wherein said transverse member having a channel for holding and sliding said X-ray generator.

14. A method for inspecting compression dead-ends on power lines using a drone-mounted X-ray payload device, the method comprising the steps of:
providing an Unmanned Aerial System (UAS) drone having an X-ray payload device including a frame with a first frame member and a second frame member fastened together with a support cage, and a cantilever X-ray panel housing, wherein said support cage having a pair of longitudinal members extending between said first frame member and said second frame member, wherein said support cage further having a plurality of arms diverging from a hook, wherein said plurality of arms connecting said pair of longitudinal members of said support cage to said hook, wherein said first frame member having a first leg and a second leg forming an inverted U-shape of said first frame member, wherein said first frame member said first leg and said second leg forming a first gap therebetween, wherein said second frame member having a first leg and a second leg forming an inverted U-shape of said second frame member, further wherein said second frame member said first leg and said second leg forming a second gap therebetween;

attaching said X-ray payload device to said UAS drone;

navigating said UAS drone to a compression dead-end location;

positioning said X-ray payload device using said UAS drone to align an X-ray plate with the compression dead-end for inspection; and passing the compression dead-end conductor through a spacing formed by said first gap and said second gap for X-raying of the compression dead-end.

15. The method for inspecting compression dead-ends on power lines using a drone-mounted X-ray payload device of claim 14, wherein said cantilever X-ray panel housing attached to a top end of said first frame member.

16. The method for inspecting compression dead-ends on power lines using a drone-mounted X-ray payload device of claim 15, wherein said cantilever X-ray panel housing having said X-ray plate.

17. The method for inspecting compression dead-ends on power lines using a drone-mounted X-ray payload device of claim 16, wherein said cantilever X-ray panel housing having a plurality of moveable pivoting supporting members for preventing lateral movement of said X-ray plate.

18. The method for inspecting compression dead-ends on power lines using a drone-mounted X-ray payload device of claim 17, wherein said X-ray plate having a rear supporting member to support a bottom surface of said X-ray panel housing.

19. The method for inspecting compression dead-ends on power lines using a drone-mounted X-ray payload device of claim 18, wherein said X-ray payload device having an X-ray generator and a support frame for holding said X-ray generator.

20. The method for inspecting compression dead-ends on power lines using a drone-mounted X-ray payload device of claim 19, wherein said frame is L-shaped having a first horizontal member, a second horizontal member, and a transverse member connecting said first horizontal member and said second horizontal member, and further wherein said transverse member having a channel for holding and sliding said X-ray generator.

* * * * *